US011962461B1

(12) United States Patent
Ficara et al.

(10) Patent No.: US 11,962,461 B1
(45) Date of Patent: Apr. 16, 2024

(54) SYSTEMS AND METHODS TO DYNAMICALLY REPROVISION NETWORK DEVICES IN A PREDEFINED AREA

(71) Applicant: Cisco Technology, Inc., San Jose, CA (US)

(72) Inventors: Domenico Ficara, Essertines-sur-Yverdon (CH); Amine Choukir, Lausanne (CH); Salvatore Valenza, Pomy (CH); Vincent Cuissard, Eteaux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/357,497

(22) Filed: Jul. 24, 2023

(51) Int. Cl.
*H04L 41/0806* (2022.01)
*H04L 41/0853* (2022.01)
*H04L 41/0893* (2022.01)

(52) U.S. Cl.
CPC ...... *H04L 41/0806* (2013.01); *H04L 41/0853* (2013.01); *H04L 41/0893* (2013.01)

(58) Field of Classification Search
None
See application file for complete search history.

(56) References Cited

U.S. PATENT DOCUMENTS

| | | | |
|---|---|---|---|
| 6,859,843 B1 | 2/2005 | Sanchez | |
| 10,194,322 B2 * | 1/2019 | Simonsson | H04W 36/22 |
| 11,121,923 B2 | 9/2021 | Valenza et al. | |
| 2008/0039046 A1 * | 2/2008 | Vilzmann | H04W 74/0825 455/296 |
| 2011/0032844 A1 | 2/2011 | Patel et al. | |
| 2015/0081887 A1 | 3/2015 | Kalkunte et al. | |
| 2017/0048109 A1 | 2/2017 | Kant et al. | |
| 2017/0156064 A1 * | 6/2017 | Simonsson | H04L 5/0069 |
| 2017/0245280 A1 | 8/2017 | Yi et al. | |
| 2023/0260384 A1 * | 8/2023 | Haines | G08B 3/10 455/411 |

OTHER PUBLICATIONS

E. Lear, Cisco Systems, R. Droms, Google, D. Romascanu, "Manufacturer Usage Description Specification", Internet Engineering Task Force (IETF); RFC: 8520, Category: Standards Track, ISSN: 2070-1721, dated Mar. 2019, 60 pages.

* cited by examiner

*Primary Examiner* — Quang N Nguyen
(74) *Attorney, Agent, or Firm* — Baker Botts L.L.P.

(57) ABSTRACT

A system and a method to dynamically reprovision network devices may include a first network device configured to reprovision a second network device in accordance with a specific location of the second network device in a predefined area. The first network device may be configured to sense the second device at the specific location in the predefined area, identify reprovisioning parameters associated with the specific location, and provide the reprovisioning parameters to the second network device. In turn, the second network device may be configured to perform one or more roles associated with the specific location in the predefined area based at least in part upon information in the reprovisioning parameters.

20 Claims, 4 Drawing Sheets

SYSTEMS AND METHODS TO DYNAMICALLY REPROVISION NETWORK DEVICES IN A PREDEFINED AREA

TECHNICAL FIELD

The present disclosure relates generally to a field of reprovisioning network devices, and more particularly, to a system and a method to dynamically reprovision network devices in a predefined area (e.g., a space).

BACKGROUND

Internet-of-Thing (IoT) devices use several processing and memory resources during provisioning operations. Further, in cases where IoT devices are newly integrated in a space, user intervention is usually required to provision a given IoT device with configuration information that would enable the given IoT device to operate in the space. In these cases, users are responsible to manually set up specific IoT devices for specific jobs in the space. Further, while some IoT devices may copy log-in information to access Internet resources, IoT devices do not set one another up.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
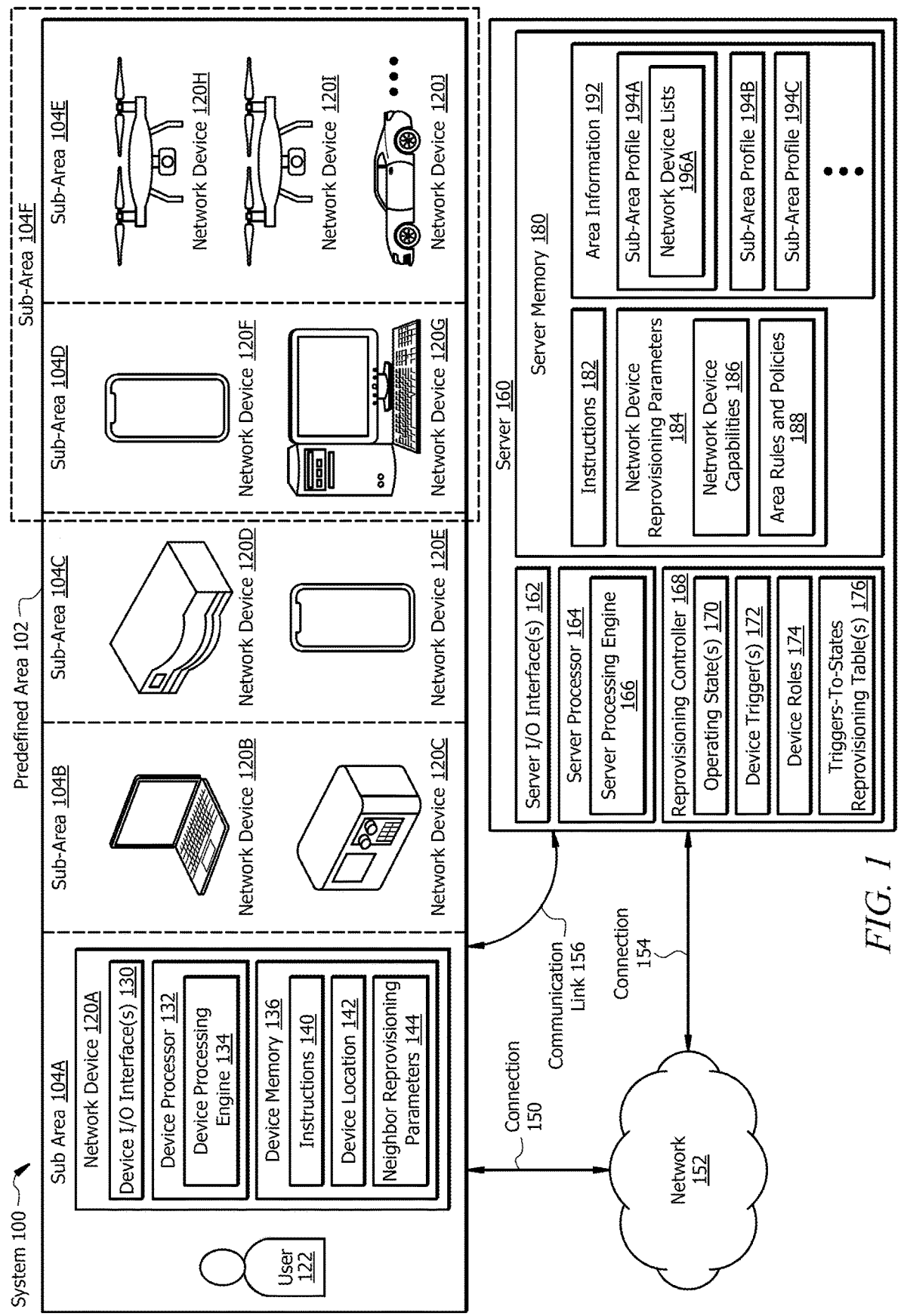
FIG. 1 illustrates an example system, according to some embodiments of the present disclosure.

In one or more embodiments, a system and a method described herein dynamically reprovision network devices in a predefined area (e.g., a space). The system and the method are configured to reprovision network devices in accordance with a predefined sub-area of the predefined area. In some embodiments, the system and the method are configured to determine a location of a specific network device within a specific sub-area of the predefined area. For example, a first network device may be reprovisioned in accordance with first reprovision parameters if the first network device is booted up or moved onto a first predefined area in the predefined area and a second network device may be reprovisioned in accordance with second reprovision parameters if the second network device is booted up or moved onto a second predefined area in the predefined area. The first network device parameters may comprise configuration information to perform one or more roles in the first predefined area. The second network device parameters may comprise configuration information to perform one or more roles in the second predefined area. In some embodiments, the network devices may be configured to perform roles in one or more predefined areas of the predefined area (e.g., for devices that may be configured to move between the first predefined area and the second predefined area. In some embodiments, the network devices may be reprovisioned based at least in part upon specific locations in which each network device is located in the predefined area or specific locations in which each network device moves within the predefined area. For example, the network device may be mounted on moving vehicles (e.g., motor vehicles in a highway, unmanned aerial systems (UASs) on the air performing disaster management, trains in a city, excavators in a mine.

In one or more embodiments, the network devices may move in different predefined areas of the predefined area and adapt corresponding behavior to the different predefined areas based on operating context surrounding each predefined area. The operating context may be a set of data incorporated in one or more reprovisioning parameters that describe roles of a given device in a predefined area at a given moment in time. The operating context may include identification of neighboring network devices sensed at a given point in time. Each network device may identify its neighbors using corresponding Media Access Control (MAC) address received via probing.

In some embodiments, network devices may determine a three-dimensional (3D) posture of multiple neighboring network devices. The 3D posture may comprise positions, direction, movement, speed, and short-term movement plans in an X-axis, a Y-axis, and a Z-axis. In other embodiments, the network devices may be configured to determine each other's device capabilities. The device capabilities may be incorporated in the reprovisioning parameters. The network devices may identify operating states, device triggers, and device roles associated with the predefined area. The operating states may comprise a set of data that describes working points of such device inside the predefined area at a given moment in time. The operating states may be performed corresponding to roles in accordance with the device triggers in the predefined area. The network devices may be provisioned in accordance with the relative location or the absolute location of each network device in the predefined area (e.g., a specific sub-area in the predefined area).

In this disclosure, the term "reprovisioning" is used interchangeably with the term "provisioning" given that a network device in a predefined area may be provisioned for a first time (e.g., the network device is new and booting up for the first time in the predefined area) or may be reprovisioned with new parameters (e.g., the network device may not be booting up for the first time, but it is assigned new roles in the predefined area).

In accordance with one or more embodiments, a system or an apparatus, such as a network device acting as a server, includes a network interface, a memory, and a processor communicatively coupled to one another. The system may dynamically reprovision network devices in specific sub-areas of the predefined area. The network interface may be configured to receive at least one connectivity signal broadcasted over a period of time. The memory may store multiple reprovisioning parameters from one or more additional network devices in the predefined area. The reprovisioning parameters may include operating context information associated with one or more roles to be performed at one or more sub-areas in the predefined area. The processor may be configured to determine a first direction of arrival associated with the at least one connectivity signal, identify a first sub-area corresponding to the first direction of arrival, generate an acknowledgement signal to be transmitted in the first direction of arrival, establish a first communication link with a network device located in the first direction of arrival, and transmit the reprovisioning parameters via the first communication link to the network device. The reprovisioning parameters may include multiple roles. A first role of the roles corresponds to a first sub-area in the predefined area. In some embodiments, performing the first role at the first sub-area in the predefined area by the network device includes defining first operating state parameters and performing the first role at the first sub-area in response to a first trigger within the first sub-area.

In some cases, a second role of the roles corresponds to a second sub-area in the predefined area. In some embodiments, performing the second role at the second sub-area in the predefined area by the network device comprises defining second operating state parameters and performing the second role at the second sub-area in response to a second trigger within the second sub-area.

In certain cases, the network device does not include instructions associated with the first role of the roles corresponding to the first sub-area in the predefined area. In other cases, the network device includes instructions associated with one or more additional roles of the roles corresponding to the first sub-area in the predefined area. The instructions may be updated to include the first operating state parameters to perform the first role at the first sub-area. The network device may perform the one or more additional roles and the first role at the first sub-area in response to updating the instructions.

In some cases, the network device comprises instructions associated with one or more additional roles of the roles corresponding to a second sub-area in the predefined area. The instructions may be updated to include the first operating state parameters to perform the first role at the first sub-area. The network device may perform the first role at the first sub-area without performing at least one of the one or more additional roles of the roles corresponding to the second sub-area in the predefined area in response to updating the instructions.

In yet other cases, the memory may be further configured to store reprovisioning parameters for first network devices located at the first sub-area in the predefined area, second network devices located at a second sub-area in the predefined area, and third network devices located at a third sub-area in the predefined area.

In some cases, the predefined area includes a house, the first sub-area is a living room of the house, the second sub-area is a bedroom of the house, and the third sub-area is a garage of the house.

In other cases, the processor is further configured to collect reprovisioning parameters associated with the network device until the network device is removed from the first sub-area in the predefined area. In another case, prior to receiving the at least one connectivity signal over the period of time, the processor is configured to perform the first role at the first sub-area. In yet other cases, the network device is a Machine Type Communication (MTC) device. In additional cases, the predefined area includes an area above a building, the first sub-area is a sub-area of the area above the building, and the network device is an Unmanned Aerial System (UAS) configured to move within the first sub-area.

In accordance with other embodiments, a method performed by a first network device comprises storing multiple reprovisioning parameters from one or more additional network devices in a predefined area. The reprovisioning parameters may include operating context information associated with one or more roles corresponding to one or more sub-areas in the predefined area. The method may comprise receiving at least one connectivity signal over a period of time from a second network device, determining a direction of arrival associated with the at least one connectivity signal, identifying a first sub-area corresponding to the direction of arrival, and generating an acknowledgement signal to be transmitted in the direction of arrival. Further, in response to transmitting the acknowledgement signal, the method may further comprise establishing a communication link between the first network device and the second network device and transmitting the reprovisioning parameters via the communication link to the second network device. The reprovisioning parameters may include multiple roles. A first role of the roles may correspond to the first sub-area in the predefined area. In some embodiments, performing the first role at the first sub-area in the predefined area by the second network device comprises defining first operating state parameters and performing the first role at the first sub-area in response to a first trigger within the first sub-area.

In accordance with yet other embodiments, a non-transitory computer readable medium in a first network device stores instructions that when executed by a processor cause the processor to dynamically reprovision network devices in specific predefined areas of the predefined area. The instructions may further cause the processor to store multiple reprovisioning parameters from one or more additional network devices in the predefined area. The reprovisioning parameters may include operating context information associated with one or more roles corresponding to one or more sub-areas in the predefined area. The instructions may cause the processor to receive at least one connectivity signal over a period of time from a second network device, determine a direction of arrival associated with the at least one connectivity signal, identify a first sub-area corresponding to the direction of arrival, and generate an acknowledgement signal to be transmitted in the direction of arrival. Further, in response to transmitting the acknowledgement signal, the instructions may cause the processor to establish a communication link between the first network device and the second network device and transmit the reprovisioning parameters via the communication link to the second network device. The reprovisioning parameters may include multiple roles. A first role of the roles may correspond to the first sub-area in the predefined area. In some embodiments, performing the first role at the first sub-area in the predefined area by the second network device may include defining first operating state parameters and performing the first role at the first sub-area in response to a first trigger within the first sub-area.

Technical advantages of certain embodiments of this disclosure may include one or more of the following. The system and the method described herein provide the technical solution of dynamically or automatically reprovision network devices in specific predefined areas of a predefined area. Specifically, the system and the method are configured to reprovision network devices in accordance with the roles to be performed in a specific area of the predefined area in which the network device is located. As a result, all network devices in the predefined area are dynamically reprovisioned to perform location-specific roles that optimize and improve corresponding operations in the predefined area. For example, a technical advantage of one embodiment may be to automatically collect neighbor reprovisioning parameters (e.g., provisioning data currently being used by neighboring network devices) including operational configuration and operational startup information via a device controller. Each network device may be configured to share respective operating context information to one another. In this regard, if a network device is removed from a specific location in the predefined area, a number of neighboring network devices may hold onto the neighbor reprovisioning parameters of the removed network device. If a new network device is determined to be placed at the same location, this new network device may be reprovisioned in accordance with the neighbor reprovisioning parameters of the removed network device.

In addition, the system and the method described herein are integrated into a practical application of increasing processing speed and reducing memory usage in the system. Specifically, the system and the method improve response speed and accuracy of set up and configuration of network devices. For example, a technical advantage of one embodiment may allow for improved reliability in real-time communications between network devices while performing corresponding location specific roles. In this regard, processing speed and memory usage are improved because each network device is aware of the roles performed by the neighboring network devices, which enables each network device to preemptively expect specific communication from specific neighbors. In another example, another technical advantage of one embodiment may be to optimize network operations in a predefined area. By assigning roles and being aware of the roles being performed in one or more sub-areas of the predefined area, multiple network devices are not reprovisioned to perform a same role if redundancies are not preferred.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2A:
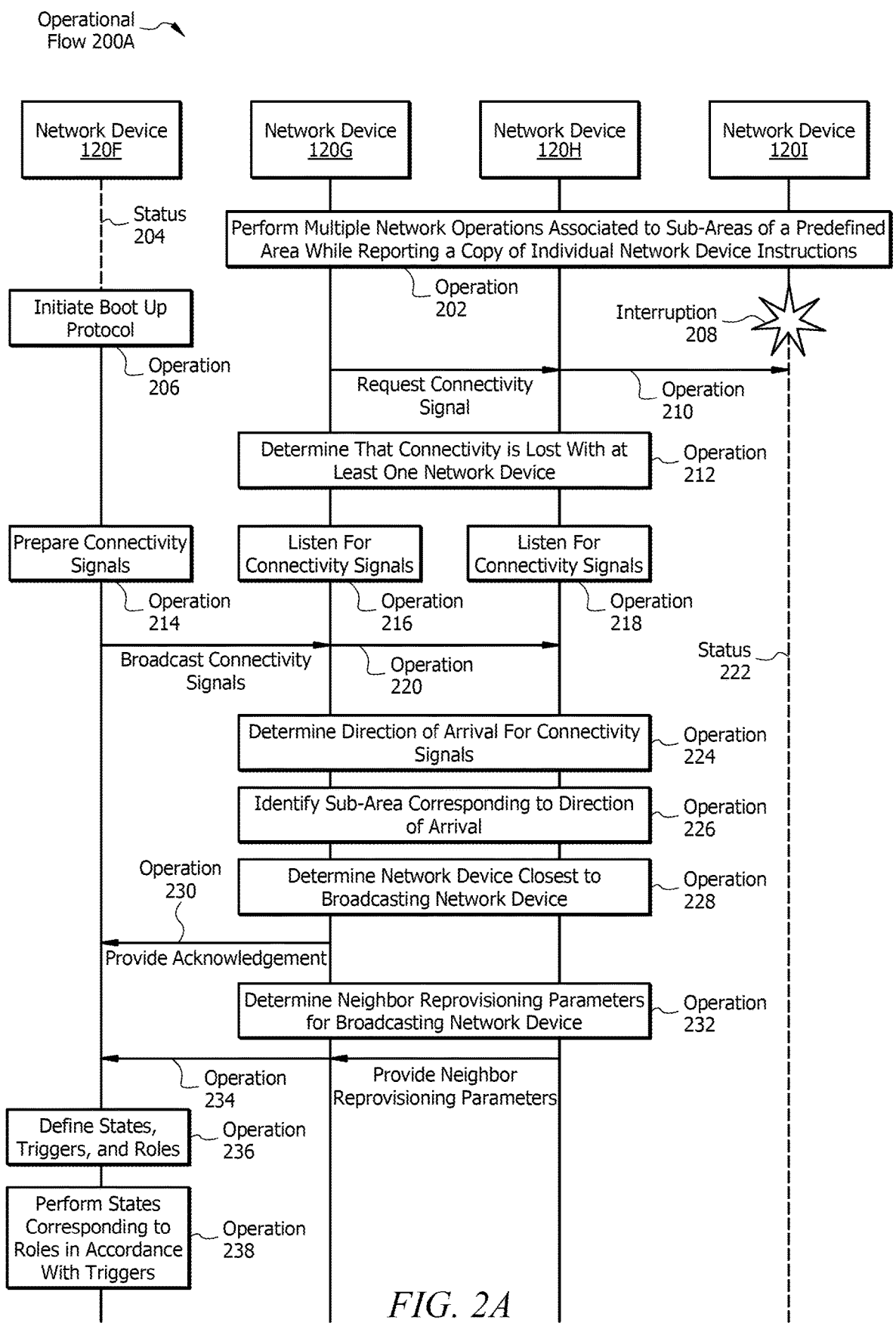
FIGS. 2A and 2B illustrate operational flows of the system of FIG. 1, according to some embodiments of the present disclosure.
Figure 2B:
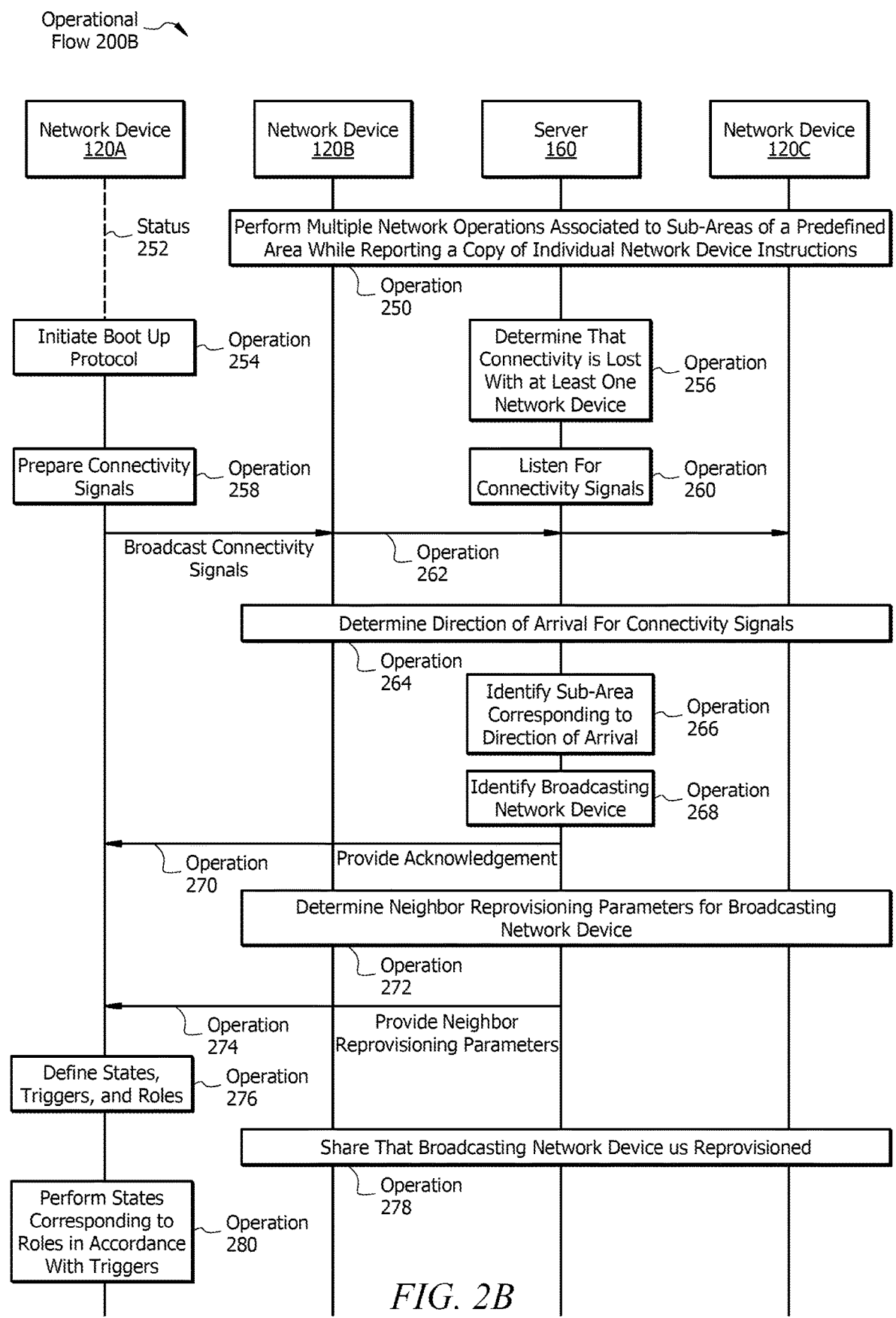
Figure 3:
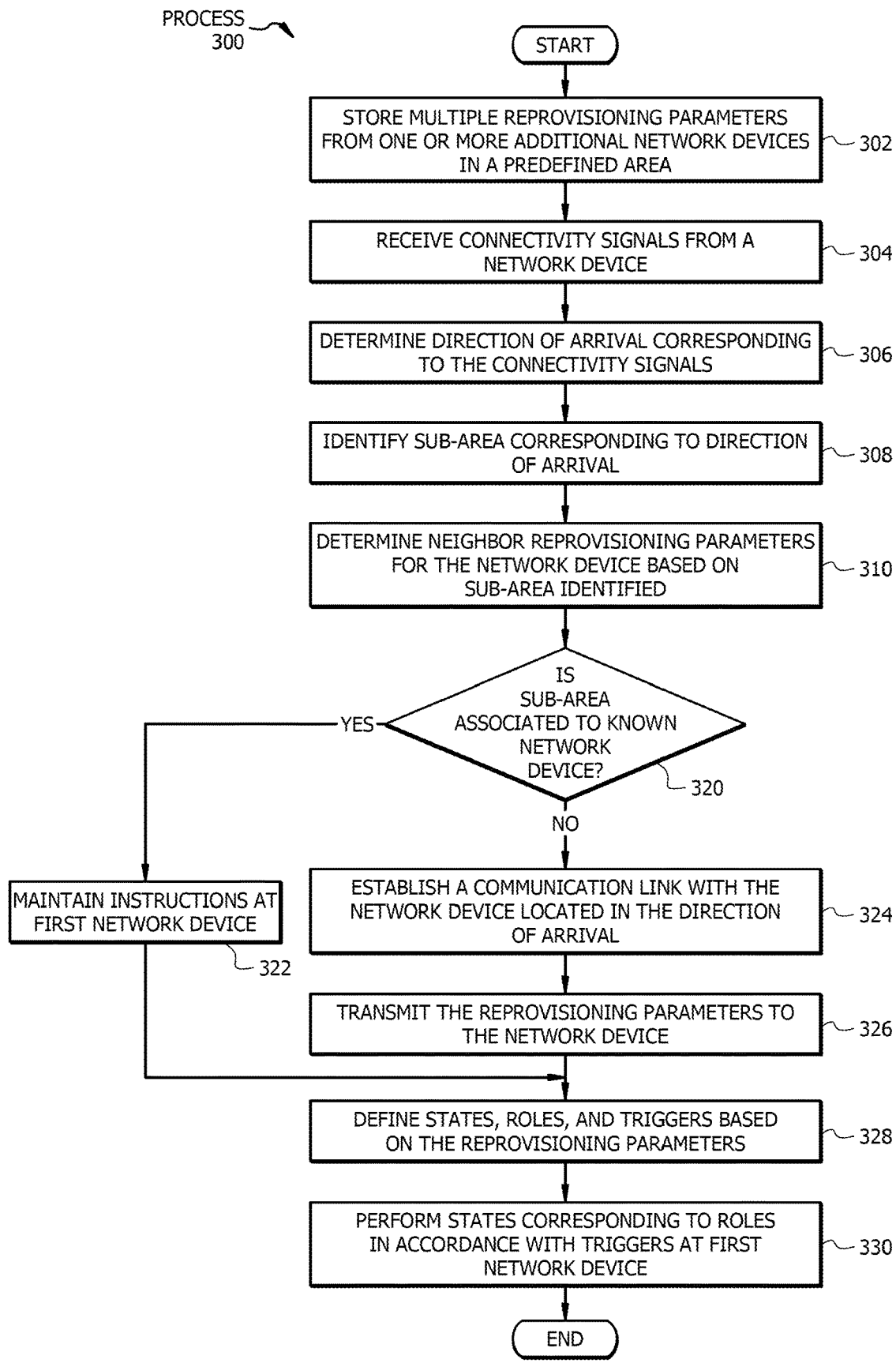
FIG. 3 illustrates an example process for performing the operational flows of FIGS. 2A and 2B, according to some embodiments of the present disclosure.

This disclosure describes systems and methods to dynamically reprovision network devices in a predefined area. In particular, this disclosure provides various systems and methods to automatically detect one or more network device locations in a predefined area and dynamically reprovision any identified network devices in accordance with corresponding locations in the predefined area. FIG. 1 illustrates a system 100 in which one or more network devices 120A-120J are dynamically reprovisioned in a predefined area 102. FIG. 2A illustrates an operational flow 200A in which a network device 120B and a network device 120C of the system 100 of FIG. 1 are configured to dynamically reprovision a network device 120A. FIG. 2B illustrates an operational flow 200B in which a server 160 of the system 100 of FIG. 1 is configured to dynamically reprovision the network device 120A. FIG. 3 illustrates a process 300 to perform the operational flow 200A of FIG. 2A or the operational flow 200B of FIG. 2B.

FIG. 1 illustrates a system 100 configured to dynamically reprovision network devices 120A-120J (collectively, network devices 120) in a predefined area 102, in accordance with one or more embodiments. The predefined area 102 may comprise multiple distinct or separate sub-areas 104A-104F (collectively, sub-areas 104). In some embodiments, the server 160 may be configured to reprovision each of the network devices 120 differently based at least upon corresponding location in each of the sub-areas 104. In other embodiments, one or more of the network devices 120 may be configured to reprovision a specific network device in any of the sub-areas 104.

In one or more embodiments, the network devices 120 comprise the network device 120A, the network device 120B, the network device 120C, a network device 120D, a network device 120E, a network device 120F, a network device 120G, a network device 120H, a network device 120I, and a network device 120J. The network devices 120 may be distributed at multiple distinct locations in the predefined area 102. In the example of FIG. 1, the network device 120A is located in a sub-area 104A, the network device 120B and the network device 120C are located in a sub-area 104B, the network device 120D and the network device 120E are located in a sub-area 104C, the network device 120F and the network device 120G are located in a sub-area 104D, and the network device 120H, the network device 120I, and the network device 120J are located in a sub-area 104E. The predefined area 102 may comprise several hundreds of network devices 120. In other embodiments, the predefined area 102 may comprise several sub-areas 104. The sub-areas 104 may partially or completely overlap one another. In some embodiments, one of the sub-areas 104 may comprise one or more additional sub-areas 104. For example, a sub-area 104F may comprise the sub-area 104D and the sub-area 104E along with the network device 120F, the network device 120G, the network device 120H, the network device 120I, and the network device 120J.

In one or more embodiments, as a non-limiting example, the network devices 120 may be associated with a user 122. There may be additional users (not shown), or no users associated with the network devices 120. In some embodiments, the network devices 120 may be unassociated with any users and perform one or more roles completely autonomously from human management or intervention. For example, the network devices 120 may be Internet-of-Things (IoT) devices or Machine Type Communication (MTC) devices comprising multiple industrial components autonomously assembling motor vehicles in a warehouse, multiple unmanned aerial systems (UASs) or unmanned aerial vehicles (UAVs) flying over a stadium performing a light show, or multiple household devices configured to communicate with one another while performing one or more household tasks. In some embodiments, some of the network devices 120 may be part of a sub-group of network devices. In an example, the network device 120H and the network device 120I may be associated to one another as UAVs performing similar tasks (e.g., roles comprising aerial sensing and diagnosis in the predefined area 102) in the sub-area 104E. In another example, the network device 120C and the network device 120D may be associated to one another as routers performing similar tasks (e.g., roles comprising routing connectivity signals in the predefined area 102) in the sub-area 104B and the sub-area 104D, respectively.

In some embodiments, the network devices 120 may be communicatively coupled to a network 152 via a connection 150 and the server 160 via a connection 154. The connection 150 and the connection 154 may be wired or wireless connections configured to provide communication links between the network devices 120, the network 152, and the server 160. In other embodiments, the network 152 and the server 160 may be partially or completely located in the predefined area 102 among the network devices 120. The server 160 may be one of the network devices 120 configured to reprovision one or more of the network devices 120 in the predefined area 102.

In other embodiments, the server 160 may take any suitable physical form. As example and not by way of limitation, the server 160 may be an embedded computer system, a system-on-chip (SOC), a single-board computer (SBC) system (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, a router device, or a combination of two or more of these. Where appropriate, the server 160 may include one or more computer systems; be unitary or distributed; span multiple locations; span multiple machines; span multiple data centers; or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, the server 160 may perform in real-time or in batch mode one or more steps of one or more methods described or illustrated herein. The server 160 may perform at different times or at different locations one or more steps of one or more methods described or illustrated herein, where appropriate.

In one or more embodiments, the server 160 may comprise one or more server I/O interfaces 162, one or more server processors 164, a reprovisioning controller 168, and a server memory 180. The server I/O interfaces 162 may comprise hardware, software executed by software, or a combination of both, providing one or more interfaces for communication between the server 160 and one or more I/O devices. The server 160 may include one or more of these I/O devices, where appropriate. One or more of these I/O devices may enable communication between a person and the server 160. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any suitable server I/O interfaces 162 for them. Where appropriate, the server I/O interfaces 162 may include one or more device or software drivers enabling the one or more server processors 164 to drive one or more of these I/O devices. Although this disclosure describes and illustrates particular I server I/O interfaces 162, this disclosure contemplates any suitable number of server I/O interfaces 162.

In one or more embodiments, the server I/O interfaces 162 may comprise a communication interface including hardware, software executed by hardware, or a combination of both providing one or more interfaces for communication (such as, for example, packet-based communication) between the server 160, the one or more network devices 120, the network 152, or one or more additional networks. As an example, and not by way of limitation, the communication interface of the server I/O interfaces 162 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable corresponding communication interface. As an example, and not by way of limitation, the server 160 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the network devices 120 may communicate with a wireless PAN (WPAN) (such as, for example, a Bluetooth WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The server 160 may include any suitable communication interface for any of these networks, where appropriate. Although this disclosure describes and illustrates the server I/O interfaces 162 comprising particular communication interfaces, this disclosure contemplates any suitable communication interface.

In some embodiments, the server I/O interfaces 162 may comprise storage and databases communicatively coupled to the one or more server processors 164, the server I/O interfaces 162, and the server memory 180. The storage and databases may comprise wired connections that share an internal bandwidth for data packet transmissions inside the server 160 with the server memory 180. The storage and databases may be configured with a buffering capacity and a memory speed. The buffering capacity may indicate a buffering capacity (in bytes) that the storage and databases are capable of handling. For example, the buffering capacity may be 1,000 bytes. Further, the memory speed may indicate a processing speed (in bytes per second) at which the storage and databases is capable of handling or buffering data packets. For example, the memory speed may be 1,000 bytes per second. The storage and databases may comprise instructions and data memory for the one or more server processors 164.

In particular embodiments, the server I/O interfaces 162 may comprise a transceiver (e.g., transmitter, receiver, or a combination of both) configured to implement one or more wireless or wired connectivity protocols. In this regard, the transceiver may comprise antennas comprising hardware configured to establish one or more communication links (e.g., via the connection 150 and the connection 154 or as a direct communication link 156) between the server 160 and one or more of the network devices 120. Although this disclosure describes and illustrates a communication link 156, this disclosure contemplates any arrangement of channels for information exchange.

In other embodiments, the server I/O interfaces 162 may comprise an interconnect including hardware configured to connect the one or more server processors 164, the reprovisioning controller 168, and the server memory 180. As an example and not by way of limitation, the interconnect may include an Accelerated Graphics Port (AGP) or a graphics bus, an Enhanced Industry Standard Architecture (EISA) bus, a front-side bus (FSB), a HyperTransport (HT) interconnect, an Industry Standard Architecture (ISA) bus, an InfiniB and interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these.

In some embodiments, the one or more server processors 164 comprise hardware for executing instructions (e.g., instructions 182), such as those making up a computer program. As an example, and not by way of limitation, to execute instructions, the one or more server processors 164 may retrieve (or fetch) the instructions from an internal register, an internal cache, or the server memory 180; decode and execute them; and then write one or more results to an internal register, an internal cache, or the server memory 180. Specifically, the one or more server processors 164 may include one or more internal caches for data, instructions, or addresses. This disclosure contemplates the one or more server processors 164 including any suitable number of internal caches, where appropriate. As an example, and not by way of limitation, the one or more server processors 164 may include one or more instruction caches, one or more data caches, and one or more translation lookaside buffers (TLBs). Instructions in the instruction caches may be copies of instructions 182 in the server memory 180, and the instruction caches may speed up retrieval of those instructions by the one or more server processors 164. Data in the data caches may be copies of data in the server memory 180 for instructions executing at the one or more server processors 164 to operate on via one or more processing engine 166; the results of previous instructions executed at the one or more server processors 164 for access by subsequent instructions executing at the one or more server processors 164 or for writing to the server memory 180; or other suitable data. The data caches may speed up read or write operations by the one or more server processors 164. The TLBs may speed up virtual-address translation for the one or more server processors 164. In particular embodiments, the one or more server processors 164 may include one or more internal registers for data, instructions, or addresses. This disclosure contemplates the one or more server processors 164 including any suitable number of suitable internal registers, where appropriate. Where appropriate, the one or more server processors 164 may include one or more arithmetic logic units (ALUs); be a multi-core processor; or include one or more additional one or more server processors 164. Although this disclosure describes and illustrates a particular processor, this disclosure contemplates any suitable processor.

In one or more embodiments, the one or more server processors 164 include hardware, software executed by hardware, or a combination of both, configured to reprovision the network devices 120 in accordance with one of the sub-areas 104 of the predefined area 102. In some embodiments, the one or more server processors 164 are configured to determine a location of a specific network device 120 within the specific sub-area 104 of the predefined area 102. The one or more server processors 164 may be a routing device configured to route resources in the network 152 to the one or more network devices 120. In some embodiments, the one or more server processors 164 may be included on a same card or die. In this regard, the one or more server processors 164 may be configured to determine a three-dimensional (3D) posture of the network devices 120. The 3D posture may comprise positions, direction, movement, speed, and short-term movement plans in an X-axis, a Y-axis, and a Z-axis. In other embodiments, the one server 160 may be configured to determine network device capabilities 186 associated with each of the network devices 120. The network device capabilities 186 may be incorporated in one or more network device reprovisioning parameters 184.

In other embodiments, the processing engine 166 may be software executed by hardware and configured to dynamically reprovision the network devices 120 in specific sub-areas 104 of the predefined area 102. The processing engine 166 may be implemented by the one or more server processors 164 operating as specialized hardware accelerators. The processing engine 166 may be configured to implement networking-specific processing tasks in custom logic and achieve better performance than typical software implementations. For example, the processing engine 166 may be lookup engines (e.g., using specialized logic), cryptographic coprocessors, content inspection engines, and the like. In some embodiments, the one or more processing engines configured to operate the reprovisioning controller 168 via execution of one or more of the instructions 182.

In one or more embodiments, the reprovisioning controller 168 is hardware, software executed by hardware, or a combination of both configured to reprovision the network devices 120 in accordance with one or more operating states 170, one or more device triggers 172, one or more device roles 174, and one or more trigger-to-states reprovisioning tables 176. In some embodiments, the server 160 may determine the 3D posture of the network devices 120. As described above, the network device capabilities 186 may be incorporated in the network device reprovisioning parameters 184. The network devices 120 may identify the operating states 170, the device triggers 172, and the device roles 174 associated with the predefined area 102. The operating states 170 may comprise a set of data that describes working points of such device inside the predefined area 102 at a given moment in time. The operating states 170 may be performed corresponding to one or more state roles 174 in accordance with the device triggers 172 in the predefined area 102. The network devices 120 may be provisioned in accordance with the relative location or the absolute location of each network device in the predefined area 102 (e.g., a specific sub-area 104 in the predefined area 102). The one or more state roles 174 are one or more tasks or jobs that each of the network devices 120 may be reprovisioned to perform in the predefined area 102. In some embodiments, performing one of the device roles 174 at one of the sub-areas 104 in the predefined area 102 by the any of the network devices 120 comprises defining the operating states 170 and performing the device roles 174 at one of the sub-areas 104 in response to one of the state triggers 172. The device triggers 172 and the device roles 174 may be associated with one another in one or more triggers-to-roles reprovisioning tables 176.

In particular embodiments, the server memory 180 includes mass storage for data or instructions. As an example, and not by way of limitation, the server memory 180 may include a hard disk drive (HDD), a floppy disk drive, flash memory, an optical disc, a magneto-optical disc, magnetic tape, or a Universal Serial Bus (USB) drive or a combination of two or more of these. The server memory 180 may include removable or non-removable (or fixed) media, where appropriate. The server memory 180 may be internal or external to a computer system, where appropriate. In particular embodiments, the server memory 180 is non-volatile, solid-state memory. In particular embodiments, the server memory 180 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the server memory 180 as a mass storage taking any suitable physical form. The server memory 180 may include one or more storage control units facilitating communication between the one or more server processors 164 and the server memory 180, where appropriate. Although this disclosure describes and illustrates particular storage, this disclosure contemplates any suitable storage.

In one or more embodiments, the server memory 180 includes a main memory for storing the instructions 182 for the one or more server processors 164 to execute or data for the one or more server processors 164 to operate on. As an example, and not by way of limitation, the network devices 120 may load the instructions 182 from another memory in the network devices 120. The one or more server processors 164 may then load the instructions 182 from the server memory 180 to an internal register or internal cache. To execute the instructions 182, the one or more server processors 164 may retrieve the instructions 182 from the internal register or internal cache and decode them. During or after execution of the instructions 182, the one or more server processors 164 may write one or more results (which may be intermediate or final results) to the internal register or internal cache. The one or more server processors 164 may then write one or more of those results to the server memory 180. In some embodiments, the one or more server processors 164 executes only the instructions 182 in one or more internal registers or internal caches or in the server memory 180 and operates only on data in one or more internal registers or internal caches or in the server memory 180.

In one or more embodiments, the server memory 180 includes commands or data associated with one or more specific applications in addition or as part of the instructions 182. In FIG. 1, the server memory 180 comprises the one or more network device reprovisioning parameters 184, and area information 192. In some embodiments, the one or more network device reprovisioning parameters 184 may be configured to provide one or more reprovisioning parameters to the network devices 120, which then perform the device roles 174 in accordance with one or more area rules and policies 188. In some embodiments, the area rules and policies 188 may be information commanding rules and/or operations of the system 100. The area rules and policies 188 may be updated dynamically or periodically over time. For example, the area rules and policies 188 may provide guidelines to access, receive, and transmit information using the network devices 120. In other embodiments, the area information 192 comprises one or more sub-area profiles 194A-194C (collectively, sub-area profiles 194). Each of the sub-area profiles 194 may comprise a network device list 196 listing network devices 120 currently located in the predefined area 102. In the example of FIG. 1, a sub-area profile 194A comprises network device lists 196A indicating that the network device 120A is located in the sub-area 104A. As non-limiting examples, a sub-area profile 194B may comprise a network device list (not shown) indicating that the network device 120B and the network device 120C are located in the sub-area 104B, and a sub-area profile 194C may comprise a network device list (not shown) indicating that the network device 120D and the network device 120E are located in the sub-area 104C. In some embodiments, the network device reprovisioning parameters 184 and the area information 192 may be updated dynamically as soon as one of the network devices 120 move locations in the predefined area 102. In other embodiments, the network device reprovisioning parameters 184 and the area information 192 may be updated periodically over time.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), random access memory (RAM)-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one or more embodiments, the network 152 may be a combination of electronic devices forming a multi-node mesh. As an example and not by way of limitation, one or more portions of the network 152 may include an ad hoc network, an intranet, an extranet, a virtual private network (VPN), a LAN, a wireless LAN (WLAN), a WAN, a wireless WAN (WWAN), a MAN, a portion of the Internet, a portion of the Public Switched Telephone Network (PSTN), a cellular technology-based network, a satellite communications technology-based network, another network 152, or a combination of two or more such networks.

Referring to the network device 120A as a non-limiting example, the network devices 120 may comprise one or more device input (I)/output (0) interfaces 130, a device processor 132 comprising a device processing engine 134, and a device memory 136 comprising one or more instructions 140, a device location 142, and one or more neighbor reprovisioning parameters 144. In one or more embodiments, the one or more network devices 120 include end-user devices such as laptops, phones, tablets, and any other suitable device that are capable of receiving, creating, processing, storing, or communicating information, including data packet transmissions. The network devices 120 may comprise one or more device I/O interfaces 130, at least one device processor 132, and a device memory 136 that is interconnected by a system bus as well as a power supply. In some embodiments, the network devices 120 represents client devices or user devices that are capable of receiving real-time data packet transmissions and may include general purpose computing devices (e.g., servers, workstations, desktop computers, and the like), mobile computing devices (e.g., laptops, tablets, mobile phones, and the like), wearable devices (e.g., watches, glasses, or other head-mounted displays (HMDs), ear devices, and the like), and so forth. The client devices 106 may also include IoT devices or equipment, such as agricultural equipment (e.g., livestock tracking and management systems, watering devices, UAVs, and the like); connected cars and other vehicles; smart home sensors and devices (e.g., alarm systems, security cameras, lighting, appliances, media players, Heating Ventilation, and Air Conditioning (HVAC) equipment, utility meters, windows, automatic doors, door bells, locks, etc.); office equipment (e.g., desktop phones, copiers, fax machines, and the like); healthcare devices (e.g., pacemakers, biometric sensors, medical equipment, and the like); industrial equipment (e.g., robots, factory machinery, construction equipment, industrial sensors, and the like); retail equipment (e.g., vending machines, point of sale (POS) devices, Radio Frequency Identification (RFID) tags, and the like); smart city devices (e.g., street lamps, parking meters, waste management sensors, and the like); transportation and logistical equipment (e.g., turnstiles, rental car trackers, navigational devices, inventory monitors, and the like); and so forth.

In one or more embodiments, the device I/O interfaces 130 may be configured to perform one or more of the operations described in reference to the server I/O interfaces 162, the device processor 132 may be configured to perform one or more of the operations described in reference to the one or more server processors 164, the device processing engine 134 may be configured to perform one or more of the operations described in reference to the server processing engine 166, and the device memory 136 may be configured to perform one or more of the operations described in reference to the one or more server memory 180. In some embodiments, the instructions 140 may be configured to perform one or more of the operations described in reference to the instructions 182. The device location 142 may be information indicating a current 3D position of the network device 120A in the sub-area 104A. The neighbor reprovisioning parameters 144 may be similar to the one or more network device reprovisioning parameters 184.

FIGS. 2A and 2B show respective examples of operational flow 200A and operational flow 200B, in accordance with one or more embodiments. In FIG. 2A, the operational flow 200A is performed by different components in the predefined area 102. In particular, the operational flow 200A may be performed by one or more of the network devices 120 in the sub-area 104F. As a non-limiting example, the network device 120F is reprovisioned by the network device 120G and the network device 120H. In the operational flow 200A, the network device 120I is also removed from the sub-area 104F. In FIG. 2B, the operational flow 200B is performed by different components in the predefined area 102. In particular, the operational flow 200B may be performed by the server 160 and one or more of the network devices 120 in the sub-area 104A and the sub-area 104B. As a non-limiting example, the network device 120A is reprovisioned by the server 160, the network device 120B, and the network device 120C.

In one or more embodiments, the server 160 and the network devices 120 are configured to exchange each other operational context and store reprovisioning parameters corresponding to one another (e.g., the neighbor reprovisioning parameters 144 and the network device reprovisioning parameters 184). The server 160 and the network devices 120 may share the reprovisioning parameters via wired or wireless broadcasting signals. Each of the network devices 120 may store the neighboring reprovisioning parameters 144 (e.g., the network device reprovisioning parameters 184) dynamically over a period of time. In one or more embodiments, the neighbor reprovisioning parameters 144 and the network device reprovisioning parameters 184 may be updated as the network devices 120 transitions between the sub-areas 104.

In some embodiments, to "transition" may comprise booting up or removing one of the network devices 120 from one of the sub-areas 104. The network devices 120 that remain in the sub-areas 104 may absorb the operating roles 174 of any devices that transition away to a different location. In this regard, a device moving from the sub-area 104A to the sub-area 104D may cause the network device 120B and the network device 120C to retain neighbor reprovisioning parameters 144 associated with the network device 120A. As the network device 120A reaches the sub-area 104D, the network device 120F and the network device 120G may be configured to reprovision the network device 120A with neighbor reprovisioning parameters 144 comprising operating states 170 and device roles 174 that are specific to the sub-area 104D. Alternatively, or in addition, as the network device 120A reaches the sub-area 104D, the network device 120F and the network device 120G may be configured to reprovision the network device 120A with neighbor reprovisioning parameters 144 comprising operating states 170 and device roles 174 that are specific to the sub-area 104F.

FIG. 2A shows the operational flow 200A in which operations 202-240 are performed by the network device 120F, the network device 120G, the network device 120H, and the network device 120I. At operation 202, the network device 120G, the network device 120H, and the network device 120I may perform multiple network operations associated with the sub-areas 104 of the predefined area 102 while reporting a copy of network device instructions 140. The network device 120G, the network device 120H, and the network device 120I may obtain neighbor reprovisioning parameters 144 corresponding to the adjacent sub-area 104C, the sub-area 104D, the sub-area 104D, or the sub-area 104F. At status 204, the network device 120F may be in an idle mode or otherwise located in another location. At operation 206, the network device 120F may initiate a boot up protocol (e.g., boot up sequence). At interruption 208, the network device 120I may be unable to continue operations in the predefined area 102. At operation 210, the network device 120G and the network device 120H transmit a request connectivity signal to the network device 120I in an attempt to reconnect. At operation 212, the network device 120G and the network device 120H determine that connectivity is lost with the network device 120I. The network device 120G and the network device 120H may save the neighbor reprovisioning parameters 144 associated with the network device 120I. Until another device is identified to be capable of performing the operations previously associated with the network device 120I in one of the same sub-areas 104 in which the network device 120I operates, the network device 120G and the network device 120H may be configured to perform one or more roles that were previously associated with the network device 120I.

The operational flow 200A continues at operation 214, where the network device 120F prepares one or more connectivity signals with the device's information as the network device 120F enters the sub-area 104F. At operation 216, the network device 120G is configured to listen for connectivity signals. At operation 218, the network device 120H is configured to listen for connectivity signals. At operation 220, the network device 120F broadcasts the connectivity signals in the sub-area 104F. The network device 120G and the network device 120H may be configured to receive and identify the connectivity signals from the network device 120F. At status 222, the network device 120I is considered to be at a different location. At operation 224, the network device 120G and the network device 120H may be configured to determine a direction of arrival for the connectivity signals. At operation 226, the network device 120G and the network device 120H may be configured to identify one of the sub-areas 104 corresponding to the direction of arrival. At operation 228, the network device 120G and the network device 120H may be configured to determine one of the network devices 120 that is closest to the broadcasting network device 120F. The network device 120G is determined to be the closest to the network device 120F. At operation 230, the network device 120G provides an acknowledgement to the network device 120F that the connectivity signals were received by the network device 120G. At operation 232, the network device 120G and the network device 120H determine neighbor reprovisioning parameters 144 for the broadcasting network device 120F. At operation 234, the network device 120G and the network device 120H may be configured to provide the neighbor reprovisioning parameters 144 to the network device 120. At operation 236, the network device 120F may be configured to define states, triggers, and roles based at least in part upon the neighbor reprovisioning parameters 144. In some embodiments, the states may be the operating states 170, the triggers may be the device triggers 172, and the roles may be the device roles 174. The roles may be some of the roles previously associated with the network device 120I. At operation 238, in response to defining the states, the triggers, and the roles, the network device 120F may be configured to perform the operating states 170 corresponding to the device roles 174 in accordance with the device triggers 172 for the sub-area 104F.

FIG. 2B shows the operational flow 200B in which operations 250-280 performed by the server 160, the network device 120A, the network device 120B, and the network device 120C. At operation 250, the network device 120B, the server 160, and the network device 120C may perform multiple network operations associated with the sub-areas 104 of the predefined area 102 while reporting a copy of network device instructions 140. As described above, the server 160 may be configured to perform one or more operations described in reference to the network device 120. The network device 120B, the server 160, and the network device 120C may obtain neighbor reprovisioning parameters 144 corresponding to the adjacent sub-area 104A and the sub-area 104B. At status 252, the network device 120A may be in an idle mode or otherwise located in another location. At operation 254, the network device 120A may initiate a boot up protocol (e.g., boot up sequence). At interruption 256, the server 160 may determine that connectivity is lost with the network device 120A. The server 160 may save the network device reprovisioning parameters 184 associated with the network device 120A. Until another device is identified to be capable of performing the operations previously associated with the network device 120A in one of the same sub-areas 104 in which the network device 120A operates, the server 160 may be configured to perform one or more roles that were previously associated with the network device 120A.

The operational flow 200B continues at operation 258, where the network device 120A prepares one or more connectivity signals with the device's information as the network device 120A enters the sub-area 104A. At operation 260, the server 160 is configured to listen for connectivity signals. At operation 262, the network device 120A broadcasts the connectivity signals in the sub-area 104A. The network device 120B, the server 160, and the network device 120C may be configured to receive and identify the connectivity signals from the network device 120A. At operation 264, the network device 120B, the server 160, and the network device 120C are configured to determine a direction of arrival for the connectivity signals. At operation 266, the server 160 may be configured to identify one of the sub-areas 104 corresponding to the direction of arrival. At operation 268, the server 160 may be configured to determine one of the network devices 120 that is closest to the broadcasting network device 120F. The network device 120G is determined to be the closest to the network device 120F. At operation 270, the server 160 provides an acknowledgement to the network device 120A that the connectivity signals were received by the server 160. At operation 272, the network device 120B, the server 160, and the network device 120C determine the network device reprovisioning parameters 184 for the broadcasting network device 120F. At operation 274, the server 160 provides the network device reprovisioning parameters 184 to the network device 120. At operation 276, the network device 120A may be configured to define states, triggers, and roles based at least in part upon network device reprovisioning parameters 184. In some embodiments, the states may be the operating states 170, the triggers may be the device triggers 172, and the roles may be the device roles 174. The roles may be some of the roles previously associated with the network device 120B or the network device 120C. At operation 278, the network device 120B, the server 160, and the network device 120C may share that the network device 120A is reprovisioned for the sub-area 104A. At operation 280, in response to defining the states, the triggers, and the roles, the network device 120A may be configured to perform the operating states 170 corresponding to the device roles 174 in accordance with the device triggers 172 for the sub-area 104A.

FIG. 3 shows an example flowchart of a process 300 to dynamically reprovision the network devices 120 in the predefined area 102, in accordance with one or more embodiments. Modifications, additions, or omissions may be made to the process 300. The process 300 may include more, fewer, or other operations than those shown below. For example, operations may be performed in parallel or in any suitable order. While at times discussed as the network devices 120 or the server 160, the one or more server processors 164, or components of any of thereof, any suitable system or components of the system 100 may perform one or more operations of the process 300. For example, one or more operations of the process 300 may be implemented, at least in part, in the form of software instructions 182 of FIG. 1, stored on non-transitory, tangible, machine-readable media (e.g., server memory 180 of FIG. 1) that when run by one or more processors (e.g., one or more server processors 164 of FIG. 1) may cause the one or more processors to perform operations described in operations 302-330.

The process 300 starts at operation 302, where the server memory 180 is configured to store multiple reprovisioning parameters from one or more additional network devices 120 in a predefined area 102. As described in reference to FIGS. 2A and 2B, the reprovisioning parameters may be collected during operations of the additional network devices 120 at corresponding specific locations in the predefined area 102. At operation 304, the one or more server processors 164 may be configured to receive connectivity signals from one of the network devices 120. As a non-limiting example, the process 300 may comprise reprovisioning the network device 120A. The network device 120A may be broadcast the connectivity signals. At operation 306, the one or more server processors 164 may determine a direction of arrival corresponding to the connectivity signals. The one or more server processors 164 may be configured to determine the direction of arrival based at least in part upon a time direction of arrival (TDOA) procedure. In other embodiments, the connectivity signals may be received by the server 160 and one or more additional network devices 120 (e.g., the network device 120B) already in communication with the server 160. At this time, the server 160 and the network device 120B may be configured to triangulate a location of the network device 120A based at least in part upon known location information associated with the server 160 and the network device 120B (e.g., these network devices 120 are in known locations or the locations are known in the predefined area 102). At operation 308, the one or more server processors 164 identify one of the sub-areas 104 corresponding to the direction of arrival, which in this case corresponds to the sub-area 104A. At operation 310, the one or more server processors 164 determine the neighbor reprovisioning parameters 144 (e.g., the network device provisioning parameters 184) for the network device 120A based at least in part upon identifying that the network device 120A in in the sub-area 104A.

The process 300 continues at operation 320, where the one or more server processors 164 determine whether the sub-area 104A is associated to one or more of the network devices 120. The server 160 may be configured to review the area information 192 to confirm the network device list 196A in the sub-area profile 194A corresponding to the sub-area 104A. Further, the server 160 may determine whether the connectivity signals were received from one of the network devices 120 in the network devices list 196A. If the one or more server processors 164 determine that the network device 120A is known to be located in the sub-area 104A (e.g., YES), the process 300 proceeds to operation 322. At operation 322, the one or more server processors 164 confirm reprovisioning parameters with the network device 120A. In this regard, the one or more server processors 164 may determine whether the instructions 140 comprise any of the operational context to be provided from the network device reprovisioning parameters 184. If the one or more server processors 164 determine that the network device 120A are not known to be located in the sub-area 104A (e.g., NO), the process 300 continues to operation 324. At operation 324, the one or more server processors 164 establish a communication link (e.g., the communication link 156) with the network device 120A located in the direction of arrival. At operation 326, the one or more server processors 164 transmit the network device reprovisioning parameters 184 to the network device 120A. At operation 328, the reprovisioning controller 168 may be configured to define states, roles, and triggers based at least in part upon the network device reprovisioning parameters 184. The states may comprise the operating states 170, the roles may be the device roles 174, and the triggers may be the device triggers 172 corresponding to the sub-area 104A in accordance with the trigger-to-roles reprovisioning tables 176.

The process 300 ends at operation 330, where the one or more server processors 164 perform the operating states 170 corresponding to the device roles 174 in accordance with the device triggers 172 at the network device 120A. At this stage, the process 300 reprovisions the network device 120A in accordance with specific network device reprovisioning parameters 184 corresponding to the sub-area 104A.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figures above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

The invention claimed is:

1. An apparatus, comprising:
 a network interface configured to receive at least one connectivity signal broadcasted over a period of time;
 a memory communicatively coupled to the network interface and configured to store a plurality of reprovisioning parameters from one or more additional network devices in a predefined area, the plurality of reprovisioning parameters comprising operating context information associated with one or more roles to be performed at one or more sub-areas in the predefined area; and
 a processor communicatively coupled to the memory and configured to:
  determine a first direction of arrival associated with the at least one connectivity signal;
  identify a first sub-area corresponding to the first direction of arrival;

generate an acknowledgement signal to be transmitted in the first direction of arrival;
establish a first communication link with a network device located in the first direction of arrival; and
transmit the plurality of reprovisioning parameters via the first communication link to the network device, wherein:
the plurality of reprovisioning parameters comprise a plurality of roles;
a first role of the plurality of roles corresponds to a first sub-area in the predefined area; and
performing the first role at the first sub-area in the predefined area by the network device comprises defining a first plurality of operating state parameters and performing the first role at the first sub-area in response to a first trigger within the first sub-area.

2. The apparatus of claim 1, wherein:
a second role of the plurality of roles corresponds to a second sub-area in the predefined area; and
performing the second role at the second sub-area in the predefined area by the network device comprises defining a second plurality of operating state parameters and performing the second role at the second sub-area in response to a second trigger within the second sub-area.

3. The apparatus of claim 1, wherein:
the network device does not comprise instructions associated with the first role of the plurality of roles corresponding to the first sub-area in the predefined area.

4. The apparatus of claim 1, wherein:
the network device comprises instructions associated with one or more additional roles of the plurality of roles corresponding to the first sub-area in the predefined area;
the instructions are updated to comprise the first plurality of operating state parameters to perform the first role at the first sub-area; and
in response to updating the instructions, the network device performs the one or more additional roles and the first role at the first sub-area.

5. The apparatus of claim 1, wherein:
the network device comprises instructions associated with one or more additional roles of the plurality of roles corresponding to a second sub-area in the predefined area;
the instructions are updated to comprise the first plurality of operating state parameters to perform the first role at the first sub-area; and
in response to updating the instructions, perform the first role at the first sub-area without performing at least one of the one or more additional roles of the plurality of roles corresponding to the second sub-area in the predefined area.

6. The apparatus of claim 1, wherein:
the memory is further configured to store reprovisioning parameters for a first plurality of network devices located at the first sub-area in the predefined area, a second plurality of network devices located at a second sub-area in the predefined area, and a third plurality of network devices located at a third sub-area in the predefined area.

7. The apparatus of claim 6, wherein:
the predefined area comprises a house;
the first sub-area is a living room of the house;
the second sub-area is a bedroom of the house; and
the third sub-area is a garage of the house.

8. The apparatus of claim 1, wherein:
the processor is further configured to collect reprovisioning parameters associated with the network device until the network device is removed from the first sub-area in the predefined area.

9. The apparatus of claim 1, the processor further configured to:
prior to receiving the at least one connectivity signal over the period of time, perform the first role at the first sub-area.

10. The apparatus of claim 1, wherein:
the network device is a Machine Type Communication (MTC) device.

11. The apparatus of claim 1, wherein:
the predefined area comprises an area above a building;
the first sub-area is a sub-area of the area above the building; and
the network device is an Unmanned Aerial System (UAS) configured to move within the first sub-area.

12. A method performed by a first network device, comprising:
storing a plurality of reprovisioning parameters from one or more additional network devices in a predefined area, the plurality of reprovisioning parameters comprising operating context information associated with one or more roles corresponding to one or more sub-areas in the predefined area;
receiving at least one connectivity signal over a period of time from a second network device;
determining a direction of arrival associated with the at least one connectivity signal;
identifying a first sub-area corresponding to the direction of arrival;
generating an acknowledgement signal to be transmitted in the direction of arrival;
in response to transmitting the acknowledgement signal, establishing a communication link between the first network device and the second network device; and
transmitting the plurality of reprovisioning parameters via the communication link to the second network device, wherein:
the plurality of reprovisioning parameters comprise a plurality of roles;
a first role of the plurality of roles corresponds to a first sub-area in the predefined area; and
performing the first role at the first sub-area in the predefined area by the second network device comprises defining a first plurality of operating state parameters and performing the first role at the first sub-area in response to a first trigger within the first sub-area.

13. The method of claim 12, wherein:
a second role of the plurality of roles corresponds to a second sub-area in the predefined area; and
performing the second role at the second sub-area in the predefined area by the second network device comprises defining a second plurality of operating state parameters and performing the second role at the second sub-area in response to a second trigger within the second sub-area.

14. The method of claim 12, wherein:
the first network device is configured to store reprovisioning parameters for a first plurality of network devices located at the first sub-area in the predefined area, a second plurality of network devices located at a second sub-area in the predefined area, and a third plurality of network devices located at a third sub-area in the predefined area.

15. The method of claim 12, wherein:
the first network device is configured to collect reprovisioning parameters associated with the second network device until the second network device is removed from the first sub-area in the predefined area.

16. The method of claim 12, wherein:
the second network device is a Machine Type Communication (MTC) device.

17. A non-transitory computer readable medium in a first network device storing instructions that when executed by a processor cause the processor to:
  store a plurality of reprovisioning parameters from one or more additional network devices in a predefined area, the plurality of reprovisioning parameters comprising operating context information associated with one or more roles corresponding to one or more sub-areas in the predefined area;
  receive at least one connectivity signal over a period of time from a second network device;
  determine a direction of arrival associated with the at least one connectivity signal;
  identify a first sub-area corresponding to the direction of arrival;
  generate an acknowledgement signal to be transmitted in the direction of arrival;
  in response to transmitting the acknowledgement signal, establish a communication link between the first network device and the second network device; and
  transmit the plurality of reprovisioning parameters via the communication link to the second network device, wherein:
    the plurality of reprovisioning parameters comprise a plurality of roles;
    a first role of the plurality of roles corresponds to the first sub-area in the predefined area; and
    performing the first role at the first sub-area in the predefined area by the second network device comprises defining a first plurality of operating state parameters and performing the first role at the first sub-area in response to a first trigger within the first sub-area.

18. The non-transitory computer readable medium of claim 17, wherein:
  a second role of the plurality of roles corresponds to a second sub-area in the predefined area; and
  performing the second role at the second sub-area in the predefined area by the second network device comprises defining a second plurality of operating state parameters and performing the second role at the second sub-area in response to a second trigger within the second sub-area.

19. The non-transitory computer readable medium of claim 17, wherein:
  the first network device is configured to store reprovisioning parameters for a first plurality of network devices located at the first sub-area in the predefined area, a second plurality of network devices located at a second sub-area in the predefined area, and a third plurality of network devices located at a third sub-area in the predefined area.

20. The non-transitory computer readable medium of claim 17, wherein:
  the first network device is configured to collect reprovisioning parameters associated with the second network device until the second network device is removed from the first sub-area in the predefined area.

* * * * *